April 13, 1965     V. L. ARCHER ETAL     3,177,846
JELLY DROPPER FOR COOKIE MAKING MACHINES
Filed Sept. 13, 1962     2 Sheets-Sheet 1
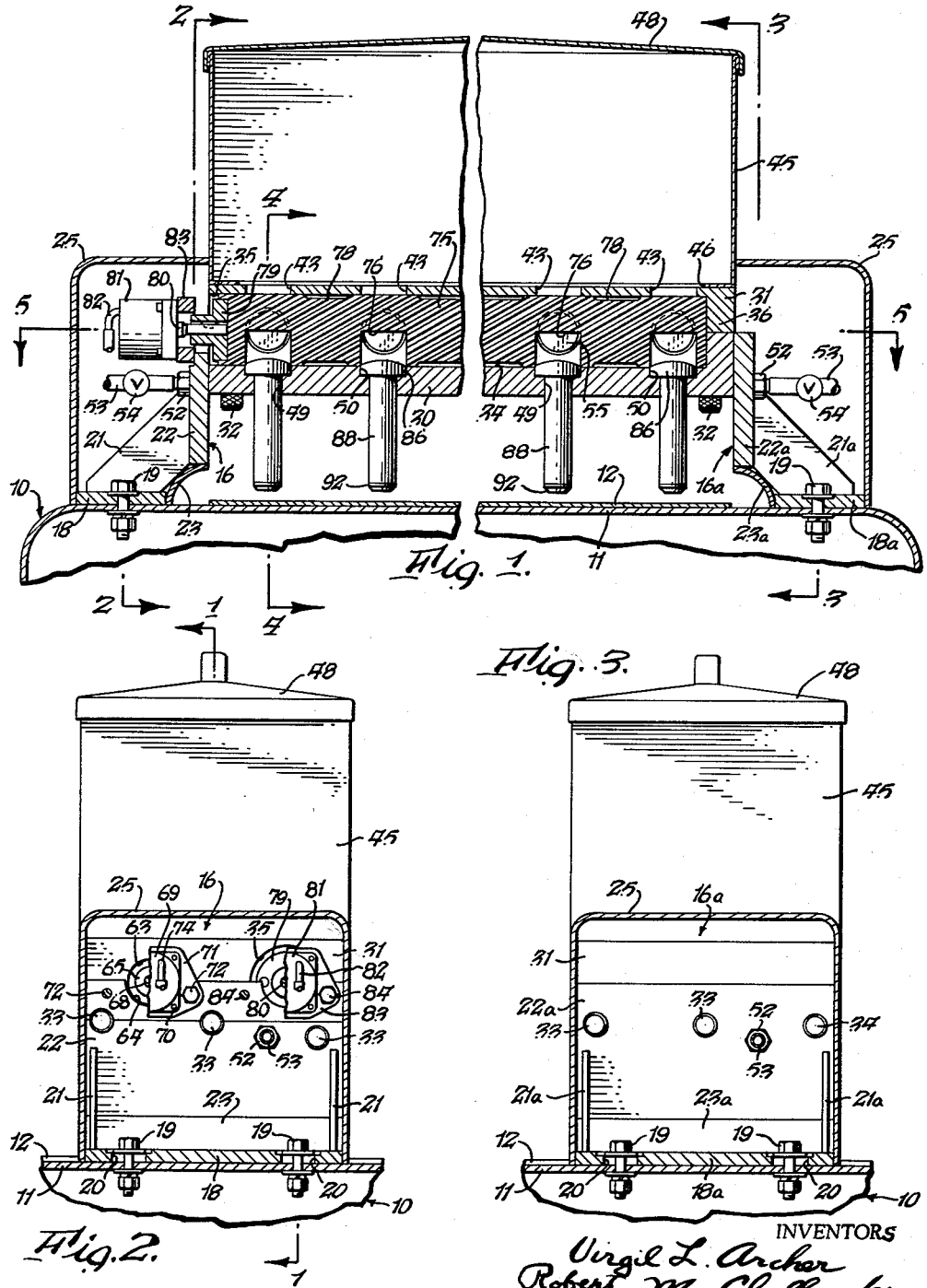

April 13, 1965
V. L. ARCHER ETAL
3,177,846
JELLY DROPPER FOR COOKIE MAKING MACHINES
Filed Sept. 13, 1962
2 Sheets-Sheet 2
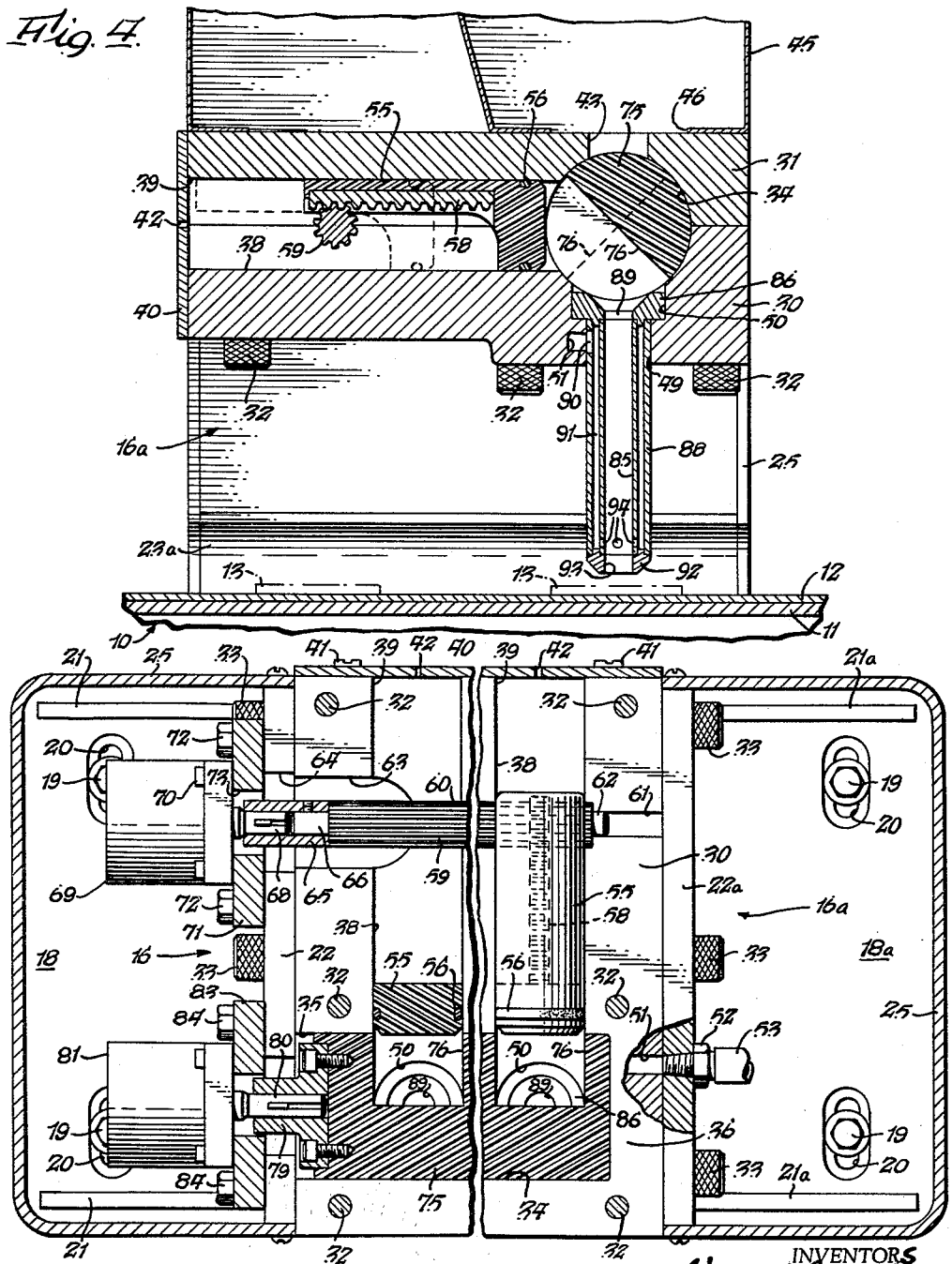
INVENTORS
Virgil L. Archer
Robert W. Challender
Joseph N. Roll
by Popp and Sommer
Attorneys United States Patent Office 3,177,846
Patented Apr. 13, 1965

3,177,846
JELLY DROPPER FOR COOKIE MAKING
MACHINES
Virgil L. Archer, Olean, Robert M. Challender, Orchard Park, and Joseph N. Roll, Buffalo, N.Y., assignors to Haut's Development Co., Inc., Olean, N.Y., a corporation of New York
Filed Sept. 13, 1962, Ser. No. 223,503
6 Claims. (Cl. 118—25)

This invention relates to a device for simultaneously depositing a row of drops or pats of jelly, jam, frosting or other topping or filling material upon a row of unbaked cookie dough forms deposited as drops or lumps at the cookie stations of a moving conveyer, such as a belt, and thereafter formed into the desired shape before reaching the jelly dropper forming the subject of the present invention.

The present invention is particularly related to the Archer application Serial No. 188,418, filed April 18, 1962, for Flour Dropper for Cookie Making Machines; the Archer application Serial No. 188,384, filed April 18, 1962, for Dough Dropper for Cookie Making Machine and to the Archer and Challender application Serial No. 231,768, filed September 6, 1962, for Flattening and Flour Dusting Device for Cookie Making Machine.

An important object of the present invention is to provide a jelly dropper which will handle all forms of jellies, jams, frostings, or other topping or filling material including very fluid and sticky materials as well as stiff jams and frostings and also including materials containing edible solids such as nuts, fruits and the like.

Another object of the present invention is to provide a machine which will simultaneously deposit a long row of drops of jelly upon the unbaked cookies on a movable conveyer in which the drops or pats are all identical as to volume, consistency, thickness, shape and location on the unbaked cookies so as to result in cookies of identical weight, shape, quality and appearance when baked.

Another object is to provide such a jelly dropper which is rapid in action so that it can be used in conjunction with the high speed production of cookies.

An important object is to greatly reduce the number of parts, this being achieved by the use of a single elongated cylindrical rotary valve stem or member having transverse ports which in one rotary position of the valve member connect a plurality of piston cylinders with the source of jelly to permit the piston to draw jelly into the cylinders, and in another rotary position of the valve member connect these piston cylinders to discharge tubes to permit the piston to discharge the jelly onto the cookie dough forms.

Another important object of the invention is to provide a rapid cut-off for each discharge of jelly and thereby avoid any dribbling or retention of jelly at the ends of the discharge tubes and providing very rapid and positive discharges of exact amounts of jelly onto the cookies. This is achieved by jets of compressed air across the stream of jelly at the outlet end of the discharge tubes.

Another object of the present invention is to provide such a jelly dropper which is supplied with a large volume of fluid jelly, jam or frosting and in which the subsequent formation of the drops of jelly is wholly a function of the machine itself and does not require careful supervision.

Another object is to provide such a jelly dropper which is free from accident hazard.

Another object is to provide such a jelly dropper which will not be seriously impaired by any foreign objects encountered in the jelly passing through large orifices both in the pumps and valves.

Another object is to provide such a jelly dropper which is easily kept in a clean and sanitary condition and in particular can readily be washed down and sanitized at the end of each run.

Another important object is to provide such a jelly dropper in which there is no escape of jelly except through the discharge tubes onto the unbaked cookies on the conveyer so that at all times the machine is free from unsightly outcroppings.

Another object is to provide such a jelly dropper which is trim and attractive in appearance and forms a desirable adjunct to a bakery.

Another important object of the invention is to provide such a jelly dropper which is simple and inexpensive in construction and which is free from servicing difficulties as well as not requiring close attention on the part of the operator.

Other objects and advantages of the invention will appear from the following description and drawings in which:

FIG. 1 is a vertical section taken generally on line 1—1, FIG. 2, through a jelly dropper embodying the present invention and showing the same as mounted on a table carrying a belt which is bridged by the jelly dropper, the belt and table being shown in section.

FIGS. 2 and 3 are vertical sections taken generally on the correspondingly numbered lines of FIG. 1.

FIG. 4 is a fragmentary enlarged vertical section taken generally on line 4—4, FIG. 1.

FIG. 5 is an enlarged fragmentary horizontal section taken generally on line 5—5, FIG. 1, it being on the same scale as FIG. 4.

The jelly dropper forming the subject of the present invention is designed for use in conjunction with a cookie making machine having a base portion 10 providing a horizontal table top 11 carrying a step-by-step belt 12 on which unbaked cookies or cookie dough forms 13 have been dropped and formed as described in detail in the said copending patent applications.

The jelly dropper embodying the present invention is shown as supported by a pair of end heads indicated generally at 16 and 16a mounted on the table top 11 on opposite sides of the belt 12 so that the jelly dropper bridges this belt to drop transverse rows of drops or pats of jelly upon transverse rows of formed, unbaked cookies 13 previously deposited and formed at the cookie stations on this belt. Each end head 16, 16a is shown as comprising a base plate 18 secured to the table top 11 by bolts 19, these bolts preferably extending through slots 20 in the base plates 18, 18a, these slots extending lengthwise of the line of travel of the belt 12 so that the jelly dropper can be adjusted to register exactly with the cookie stations of this belt when it is brought to a stop. The base plates are each shown as having a pair of vertical braces or ribs 21, 21a projecting diagonally upwardly therefrom and supporting a vertical plate 22, 22a, these plates at the opposite sides of the belt 12 being in parallel opposed relation to each other. Each end head 16, 16a is completed by a quarter round strip of sheet metal 23, 23a the lower edge of which is welded to the edge of its base plate which faces the belt 12 and the other edge of which is welded to the underside of the vertical plate of its end head.

Each of these end heads 16, 16a can be enclosed by a readily removable sheet metal housing or casting 25 the lower rim of which is shown as fitting around the ends and outer side of the base plate 18 or 18a and the sides of which embrace the vertical side edges of the vertical plates 22 or 22a. Each sheet metal casting 25 preferably extends above these end plates 22, 22a as best shown in FIG. 1.

The end heads 16, 16a jointly support the two-part body or block of a valved jelly pump and which body comprises a lower half section or block 30 and an upper half section or block 31 having faces mating in a horizontal plane, these half sections or blocks being secured together by screws 32 and the lower half section or block 30 being secured at its ends, as by screws 33, to the upright plates 22, 22a of the end heads 16, 16a. These two half sections or blocks 30, 31 are jointly formed to provide a single longitudinal valve bore 34 which extends transversely of the line of movement of the belt 12 and the axis of which is in the plane of the mating faces of these half sections. This valve bore is arranged toward the downstream side of the body 30, 31 and is open at the end of this body supported by the end head 16, as indicated at 35, but is blind at the end of the body supported by the end head 16a, as indicated at 36. Above the cookie stations of each row on the belt 12, the half sections or blocks 30, 31 are jointly formed to provide horizontal piston bores 38 which are open at the upstream side of these blocks, as indicated at 39, and the opposite or inner ends of which open into the valve bore 34 extending transversely thereof. The axes of these piston bores are also in the horizontal plane of the mating faces of the body sections 30, 31 and are in the line of movement of the belt 12. The open ends 39 of the piston bores 38 are covered by a plate 40 secured, as by screws 41, to the vertical upstream face of the body 30, 31 and this plate is shown as having a vent 42 leading to the outer end of each bore to accommodate the movement of a piston therein as hereinafter described.

In line with each horizontal piston bore 38 a vertical jelly inlet bore 43 is provided extending through the top of the upper half section or block 31 into the valve bore 34 and through which jelly or the like is admitted from a hopper 45 supported on the upper half section or block 31 and secured thereto in any suitable manner. This hopper has a slot 46 in its bottom which encompasses all of the inlet bores 43 and also preferably has a cover 48 for its open top through which open top the hopper is refilled with jelly, jam, frosting or other topping or filling material for the cookies.

In line with each of the horizontal piston bores 38, the lower half section or block 30 is provided with a vertical outlet or discharge bore 49 extending through its bottom and having a counterbore 50 connecting with the valve bore 34. Additionally, the lower half section or block 30 is provided with a passage 51 extending lengthwise thereof and connecting with each of the vertical inlet bores 49 as best shown in FIG. 4. The opposite ends of this passage 51 are open and have a fitting 52 secured therein, these fittings being for connection with compressed air lines 53. These compressed air lines are valved, as indicated at 54, these valves being opened in synchronism with other operations as hereinafter described.

In each of the piston bores 38 is slidingly fitted a piston 55, this piston being preferably made of plastic and its working end face being arranged to be brought close to the valve bore 34, as best shown in FIG. 4. Each piston 55 preferably has a piston ring 56 to prevent the escape of jelly and is provided with a tail piece in the underside of which is embedded a rack 58, the teeth of which project downwardly and into engagement with a pinion 59 rotatable within a bore 60 jointly provided by the two half sections or blocks 30, 31 and arranged parallel with the valve bore 34. This pinion bore 60 extends completely through the body 30, 31, but adjacent the end head 16a is of reduced diameter, as indicated at 61, to receive the reduced diameter end 62 of the pinion 59. At the opposite end adjacent the end head 16, this pinion bore 60 is enlarged, as indicated at 63, and in line with this enlarged end 63 the vertical end plate 22 of the end head 16 is provided with a semicircular recess 64 in this top. A coupling sleeve 65 connects the reduced end 66 of the pinion 59 with the operating shaft 68 of a hydraulic reciprocating torque actuator 69. This hydraulic reciprocating torque actuator 69 is secured, as by screws 70, to a mounting plate 71 which in turn is secured by screws 72 to the outside face of the plate 22 of the end head 16, the operating shaft 60 extending through an opening 73 in this mounting plate. The control lines through which fluid under pressure is supplied to rotate the output shaft 68 back and forth are indicated at 74.

A cylindrical valve member or rotary valve stem 75 is rotatably contained within the valve bore 34, this valve member preferably being in the form of a plastic cylinder having a series of spaced ports 76 arranged to register with the bores 38, 43 and 49. These ports are in the form of semicircular recesses formed in one side of the cylindrical valve member 75, the base of each being in a common diametral plane as shown in FIG. 4. By this shape, as shown by full lines in FIG. 4, the ports 76 in one rotative position of the cylindrical valve member 75 can connect all the piston bores 38 with the discharge bores 49 of the body 30, 31, whereas by turning the cylindrical valve member 75 90° clockwise to the position shown by the dotted line in FIG. 4, the ports 76 connect the inlet bores 43 with the piston bores 38. Intermediate the several working areas of the cylindrical valve member 75, the valve member can be relieved or reduced in cross sectional size, as indicated at 78, to reduce friction.

One end of the cylindrical valve member 75 bears against the blind end 36 of the valve bore 34 and the opposite end is provided with a metal hub 79, preferably molded therein, in which is keyed the shaft 80 of a hydraulic reciprocating torque actuator 81. This hydraulic reciprocating torque actuator rotates the cylindrical valve member 75 from one position to the other and is controlled by hydraulic control lines 82. As with the reciprocating torque actuator 69, the reciprocating torque actuator 81 is mounted on a mounting plate 83 secured by screws 84 to the outside face of the plate 22 of the end head 16.

The jelly dropper has a vertical discharge tube 85 secured within each of the discharge bores 49 of the body 30, 31, the lower ends of these discharge tubes being in closely spaced relation to the passing rows of cookies. Means are also provided to jet streams of compressed air at the bottom of each discharge tube 85 across the stream of jelly being discharged to provide an instant cutoff to the discharge of jelly or jam thereby not only to insure identical amounts of jelly or jam being deposited on all of the cookie forms, but also insuring against any dribbling of the jelly from the bottom of the discharge tube or the clinging of any jelly to the bottoms of these tubes. With the rapid compressed air cutoff, which forms an important feature of the present invention, discharge of the jelly as pats or spreads onto the cookie forms is very rapid and accurate in placement and amount, and insures identical discharges on all of the cookie forms.

To this end the upper end of each discharge tube 85 is secured to a cylindrical end head 86 which is removably received in the counterbore 50. To each end head 86 is also secured a jacket tube 88 which sliding fits within the smaller diameter part of the bore 49 so that when the halves 30, 31 forming the valve body are separated, the several discharge and jacket tubes 85, 88 can readily be removed upwardly for cleaning purposes. Each end head 86 has a central through opening 89 registering with the interior of its discharge tube 85 and each jacket tube 88 has a port 90 between the compressed air passage 51 and the space 91 between the discharge and jacket tubes 85, 88. The lower end of each pair of these tubes 85, 88 is enclosed by a nozzle or end head 92 which blocks the lower end of the space 91 and also is provided with a through bore 93 in line with the interior of its discharge tube 85. An annular series of ports 94 are provided through the lower end of each discharge tube 85 to admit jets of compressed air to the interior thereof.

In the operation of the device as above described, the hopper 45 is filled with jelly, jam, frosting or other filling or topping material and the belt 12 is advanced step-by-step to bring successive rows of cookie stations under the discharge tubes 85. The unbaked cookies or cookie dough forms 13 have been placed on these cookie stations and hence at each advance of the belt 12 a row of unbaked cookies 13 is brought under the row of discharge tubes 85. While the belt is so advancing, the hydraulic reciprocating torque actuator 81 is energized to rotate the cylindrical valve member 75 to the position in which its line of ports 76 connect the jelly inlet bores 43 to the valve body 30, 31 with the piston bores 38. At this time the other hydraulic reciprocating torque actuator 69 is actuated to turn the pinion 59 in the direction in which, through the racks 58, it draws the plungers 55 away from the cylindrical valve member 75. As a consequence, jelly from the hopper 45 is sucked through the inlet bores 43 into the plunger bores 38 by the retracting plungers 55. The amount of jelly so drawn in is determined by the extent to which the plungers 55 are retracted, this being changed by adjusting the amount of fluid applied to the hydraulic reciprocating torque actuator 69. It will therefore be seen that the plunger bores 38 are also measuring chambers the effect of which can be easily adjusted by adjusting the hydraulic reciprocating torque actuator 69.

The cylindrical valve member 75 is then rotated counterclockwise, as viewed in FIG. 4, to the full line position illustrated in this figure and in which position the ports 76 in the cylindrical valve member 75 disconnect from the inlet bores 43 and instead connect the plunger bores 38 with the discharge bores 49 and thence, through the ports 89, with the discharge tubes 85. This is done by the hydraulic reciprocating torque actuator 81. The actuating fluid to the other hydraulic reciprocating torque actuator 69 is then reversed so as to rotate the pinion 59 in the direction to project the plungers 55, through the racks 58, toward the cylindrical valve member 75. As a result the measured amounts of jelly contained within the plunger bores 38 are discharged through the ports 76 and 89 into the tops of the discharge tubes 85 and thence through the ports 93 in the nozzles 92 at the bottoms of these tubes onto the row of unbaked cookies 13 thereunder.

When the piston reaches the end of this stroke, the valve means 54 is opened to admit compressed air from the lines 53 to the opposite ends of the passage 51. This compressed air passes through the ports 90 into the spaces 91 between the discharge tubes 85 and jacket tubes 88. This air can only escape through the annular row of ports 94 in the bottoms of the discharge tubes across the columns of jelly contained within these discharge tubes. These compressed air streams instantly shear off the bottom of this column and force it downwardly onto the cookie forms. As a result of this compressed air cutoff, exact amounts of jelly are rapidly deposited on the several unbaked cookies 13 without dribble or hang-up of any jelly on the nozzles 92 and the discharge can be accomplished very rapidly.

The belt 12 then advances another step and the hydraulic reciprocating torque actuator 81 rotates the cylindrical valve member 75 clockwise as viewed in FIG. 4 to the position assumed at the start of this description of the operation, that is, connecting the jelly inlet bores 43 with the piston bores 38 for another sequence of operation as above described.

It will particularly be noted that the simple one piece cylindrical valve member 75 serves the double function of first connecting the several jelly inlet bores 43 with the plunger bores 38 following which it serves to connect these plunger bores 38 with the discharge bores 49 and discharge tubes 85. It will also be noted that by virture of the two-part body 30, 31 the entire jelly dropper can readily be dismantled and cleaned, the plungers 55, pinion 59, discharge tubes 85–92 and cylindrical valve member 75 being readily lifted out after separation of these body parts. It will also be noted that by the compressed air cutoffs in the form of jets issuing from the ports 94 across the jelly discharged downwardly through the discharge tubes 85, exact amounts of jelly can rapidly be placed upon the unbaked cookie forms 13 and also that the discharge tubes are free from any dribble as well as free from any undesired retention of jelly at their lower ends.

By the word "jelly" as used herein is meant to include all equivalent jams, frostings, toppings or fillings.

We claim:

1. In a cookie making machine having a base carrying a step-by-step conveyer having a progression of transverse rows of cookie stations thereon; the combination therewith of a jelly dropper adapted to deposit separate drops of jelly or the like on unbaked cookies previously placed and formed on said conveyer at said cookie stations, comprising a body above said conveyer having a cylindrical generally horizontal valve bore extending transversely of the conveyer and said body also having a first generally vertical bore above each cookie station of each of said rows, opening downwardly into said cylindrical valve bore, a second generally vertical bore, above each cookie station of each of said rows, extending downwardly from said cylindrical valve bore through the bottom of said body and a piston bore, above each cookie station of each of said rows, communicating with said cylindrical valve bore between said first and second generally vertical bores, means supplying jelly or the like to said first vertical bores, a piston in each piston bore, means reciprocating said pistons, a rotary cylindrical valve member in said cylindrical valve bore and having, above each cookie station of each of said rows, a port connecting, in one rotative position of said cylindrical valve member, said first bore with said piston bore to permit predetermined filling of said piston bores on retraction of said pistons from said cylindrical valve member, and said port connecting, in another rotative position of said cylindrical valve member, said piston bore with said second bore to permit discharge of said jelly or the like onto said conveyer on projection of said pistons toward said cylindrical valve member, means oscillating said cylindrical valve member between said positions, and means located at the lower end of each of said second vertical bores and arranged to project a jet of compressed gas transversely across the stream of jelly or the like being discharged from the lower end of each of said second vertical bores.

2. In a cookie making machine having a base carrying a step-by-step conveyer having a progression of transverse rows of cookie stations thereon; the combination therewith of a jelly dropper adapted to deposit separate drops of jelly or the like on unbaked cookies previously placed and formed on said conveyer at said cookie stations, comprising a body above said conveyer having a cylindrical generally horizontal valve bore extending transversely of the conveyer and said body also having a first generally vertical bore, above each cookie station of each of said rows, opening downwardly into said cylindrical valve bore, a second generally vertical bore, above each cookie station of each of said rows, extending downwardly from said cylindrical valve bore through the bottom of said body and a piston bore, above each cookie station of each of said rows, communicating with said cylindrical valve bore between said first and second generally vertical bores, means supplying jelly or the like to said first vertical bores, a piston in each piston bore, means reciprocating said pistons, a rotary cylindrical valve member in said cylindrical valve bore and having, above each cookie station of each of said rows, a port connecting, in one rotative position of said cylindrical valve member, said first bore with said piston bore to permit predetermined filling of said piston bores on retraction of said pistons from said cylindrical valve member, and said port connecting, in another rotative position of said cylindrical valve member, said piston bore with said second bore to permit discharge of said jelly or the like onto said conveyer on projection of said pistons toward said cylindrical valve member, means oscillating said cylindrical valve member between said positions, a generally vertical discharge tube forming a downward continuation of each of said second bores and having an open bottom discharge end, and means located at said discharge end of each of said tubes and arranged to project a jet of compressed gas transversely across the stream of jelly or the like being discharged from the lower end of each of said discharge tubes.

3. In a cookie making machine having a base carrying a step-by-step conveyor having a progression of transverse rows of cookie stations thereon; the combination therewith of a jelly dropper adapted to deposit separate drops of jelly or the like on unbaked cookies previously placed and formed on said conveyer at said cookie stations, comprising a body above said conveyer having a cylindrical generally horizontal valve bore extending transversely of the conveyer and said body also having a first generally vertical bore, above each cookie station of each of said rows, opening downwardly into said cylindrical valve bore, a second generally vertical bore, above each cookie station of each of said rows, opening downwardly into said cylindrical valve bore, a second generally vertical bore, above each cookie station of each of said rows, extending downwardly from said cylindrical valve bore through the bottom of said body and a piston bore, above each cookie station of each of said rows, communicating with said cylindrical valve bore between said first and second generally vertical bores, means supplying jelly or the like to said first vertical bores, a piston in each piston bore, means reciprocating said pistons, a rotary cylindrical valve member in said cylindrical valve bore and having, above each cookie station of each of said rows, a port connecting, in one rotative position of said cylindrical valve member, said first bore with said piston bore to permit predetermined filling of said piston bores on retraction of said pistons from said cylindrical valve member, and said port connecting, in another rotative position of said cylindrical valve member, said piston bore with said second bore to permit discharge of said jelly or the like onto said conveyer on projection of said pistons toward said cylindrical valve member, means oscillating said cylindrical valve member between said positions, a generally vertical discharge tube forming a downward continuation of each of said second bores, a shell enclosing and forming an enclosed space around the sides of each of said discharge tubes, means supplying compressed gas to the space between each discharge tube and jacket, and a port through the wall of said discharge tube at the lower end thereof and providing communication between said space and the interior of said discharge tube.

4. In a cookie making machine having a base carrying a step-by-step conveyer having a progression of transverse rows of cookie stations thereon; the combination therewith of a jelly dropper adapted to deposit separate drops of jelly or the like on unbaked cookies previously placed and formed on said conveyer at said cookie stations, comprising means forming a row, extending transversely above said conveyer, of generally vertical discharge tubes having open discharge ends in position to severally register with the jelly stations of each row, means forcing a predetermined quantity of jelly or the like into each of said tubes, and means located at said discharge end of each of said tubes and operated at the end of the operation of said forcing means to project a jet of gas transversely across the stream of jelly or the like being discharged from said discharge end of each of said discharge tubes thereby to avoid dribbling of jelly from said tubes following the discharge of said predetermined quantities of jelly therefrom.

5. The combination set forth in claim 4 wherein each of said jet producing means comprises a shell enclosing and forming an enclosed space around the sides of each of said discharge tubes, means supplying compressed gas to the space between each discharge tube and jacket, and a port through the wall of said discharge tube at said discharge end thereof and providing communication between said space and the interior of said discharge tube.

6. In a cookie making machine having a base carrying a step-by-step conveyer having a progression of transverse rows of cookie stations thereon; the combination therewith of a jelly dropper adapted to deposit separate drops of jelly or the like on unbaked cookies previously placed and formed on said conveyer at said cookie stations, comprising a body above said conveyer having a cylindrical generally horizontal valve bore extending transversely of the conveyer and said body also having a first generally vertical bore, above each cookie station of each of said rows, opening downwardly into said cylindrical valve bore, a second generally vertical bore, above each cookie station of each of said rows, extending downwardly from said cylindrical valve bore through the bottom of said body, a piston bore, above each cookie station of each of said rows, communicating with said cylindrical valve bore between said first and second generally vertical bores and a cylindrical pinion bore parallel with said cylindrical valve bore and communicating with each of said piston bores, said body being in the form of a two-part block having mating faces in a plane which includes the axes of said cylindrical valve bore, piston bores and cylindrical pinion bore, means supplying jelly or the like to said first vertical bores, a piston in each piston bore, a rack secured to each piston, a pinion in said cylindrical pinion bore and extending across all of said piston bores and meshing with the racks therein, means rotating said pinion back and forth to reciprocate said pistons, a rotary cylindrical valve member in said cylindrical valve bore and having, above each cookie station of each of said rows, a port connecting, in one rotative position of said cylindrical valve member, said first bore with said piston bore to permit predetermined filling of said piston bores on retraction of said pistons from said cylindrical valve member, and said port connecting, in another rotative position of said cylindrical valve member, said piston bore with said second bore to permit discharge of said jelly or the like onto said conveyer on projection of said pistons toward said cylindrical valve member, and means oscillating said cylindrical valve member between said positions.

References Cited by the Examiner
UNITED STATES PATENTS

| | | | |
|---|---|---|---|
| 333,140 | 12/85 | Longley | 222—409 |
| 1,066,660 | 7/13 | Ross | 107—28 |
| 1,156,407 | 10/15 | Kettner | 107—28 |
| 1,404,548 | 1/22 | Salerno | 107—28 |
| 1,477,857 | 12/23 | Vierow | 107—28 |
| 1,651,242 | 11/27 | Baker | 107—28 |
| 2,260,686 | 10/41 | Segrin | 118—20 X |

RICHARD D. NEVIUS, *Primary Examiner.*